United States Patent [19]

Murphy

[11] Patent Number: 5,462,015
[45] Date of Patent: Oct. 31, 1995

[54] KENNEL HULL LATCH

[75] Inventor: Thomas B. Murphy, Arlington, Tex.

[73] Assignee: Doskocil Manufacturing Co. Inc., Arlington, Tex.

[21] Appl. No.: 252,420

[22] Filed: Jun. 1, 1994

[51] Int. Cl.$^6$ ................................................ A01K 1/03
[52] U.S. Cl. .......................... 119/19; 292/57; 292/241; 119/165
[58] Field of Search ........................ 119/19, 17, 265, 119/266, 165, 166, 167, 168, 169, 170; 190/120; 292/DIG. 7, 57, 205, 241, DIG. 30

[56] References Cited

U.S. PATENT DOCUMENTS

| | | | |
|---|---|---|---|
| 622,546 | 4/1899 | Shaw . | |
| 709,591 | 9/1902 | Bennett . | |
| 974,116 | 11/1910 | Bray | 292/241 |
| 979,884 | 12/1910 | Pelar . | |
| 1,201,722 | 10/1916 | Halteman | 292/205 |
| 1,243,115 | 10/1917 | Shur . | |
| 1,712,792 | 5/1929 | Hansen . | |
| 2,007,065 | 7/1935 | Walker | 292/205 |
| 2,301,078 | 11/1942 | Perron | 292/241 |
| 2,542,332 | 2/1951 | Holmsten | 292/205 |
| 3,490,417 | 1/1970 | Swinney | 119/19 |
| 3,811,718 | 5/1974 | Bates | 292/241 |
| 4,264,092 | 4/1981 | Borne | 292/241 |
| 4,389,062 | 6/1983 | Rosenberg | 292/190 |
| 4,807,914 | 2/1989 | Fleming et al. | 292/48 |
| 4,964,755 | 10/1990 | Lewis et al. | 404/25 |
| 4,973,092 | 11/1990 | Godbe et al. | 292/241 |
| 5,042,855 | 8/1991 | Bennett et al. | 292/241 |
| 5,220,885 | 6/1993 | Goetz | 119/19 |

OTHER PUBLICATIONS

Photographs of Igloo® Storage Bin Latch, 1993.

Primary Examiner—Todd E. Manahan
Attorney, Agent, or Firm—Mark D. Perdue; Andrew J. Dillon

[57] ABSTRACT

An improved latch for securing together two portions of enclosure in which a rotary latch member is secured for rotation to an upstanding wall of one of the portions of the enclosure. The latch member includes a generally circular disk having an annular wall formed about the periphery thereof, the annular wall having an interruption therein and the latch member being rotatable between locked and unlocked positions. A lug is formed on an upstanding wall of the second portion of the enclosure upon assembly of the two portions of the enclosure, the lug is received interior of the annular wall through the interruption therein and the latch member is rotated to the locked position to confine the lug within the annular wall. A stop member extends from one of the upstanding walls generally adjacent the periphery of the disk and includes a locking aperture. A locking lug extends generally outward from the annular wall of the latch member and generally tangentially to the periphery of the disk. The locking lug cooperates with the stop member in the locked position to limit rotational movement of the latch member. An aperture is formed in the locking lug to register with the locking aperture in the stop member to permit the latch member to be secured against rotation in the locked position in which the two portions are secured together.

12 Claims, 2 Drawing Sheets

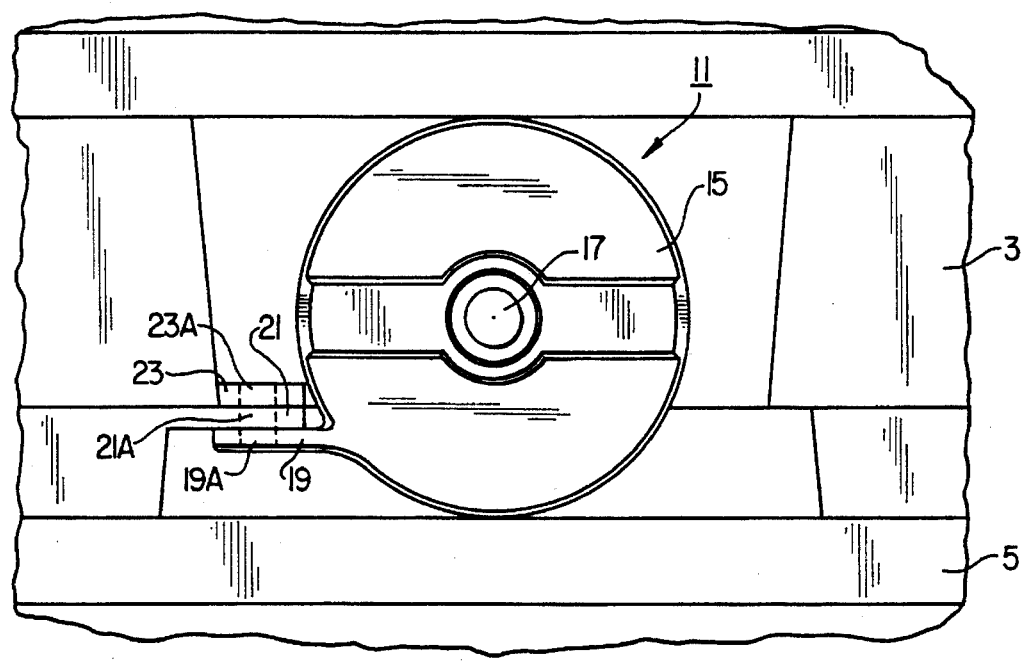
FIG. 2
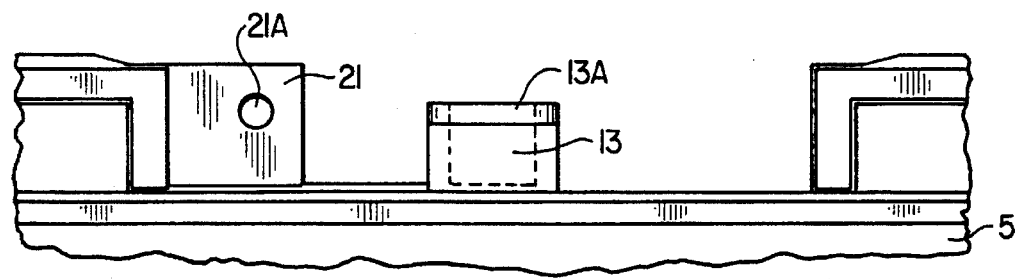
FIG. 4
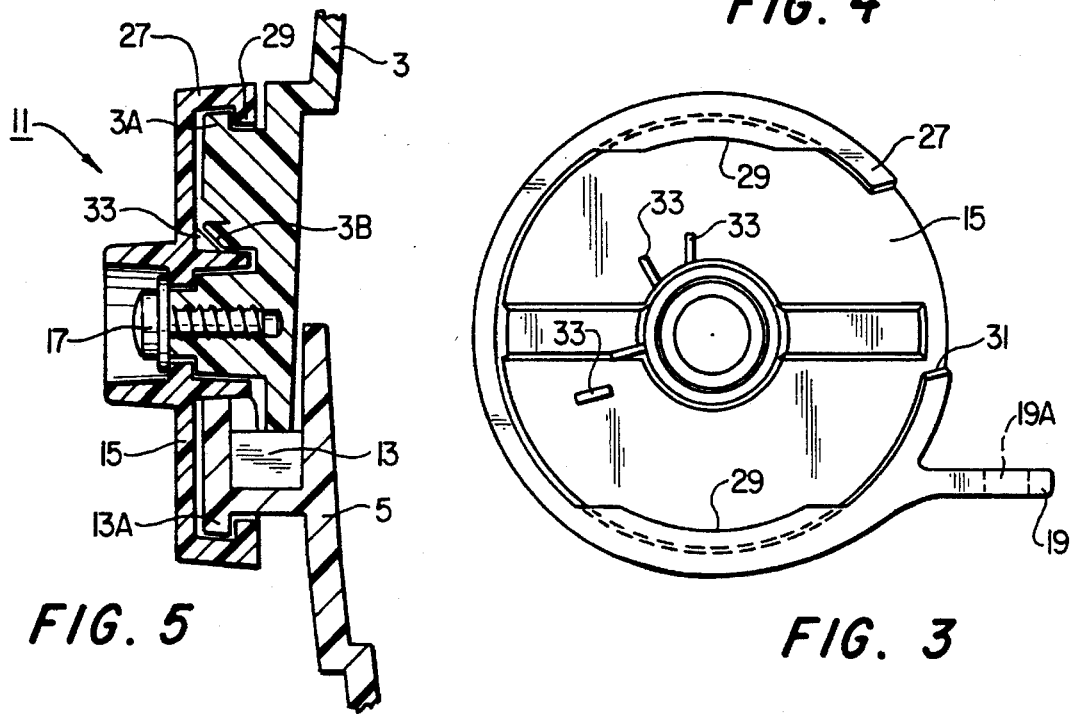
FIG. 5
FIG. 3

KENNEL HULL LATCH

BACKGROUND OF THE INVENTION

1. Field of the Invention

The invention relates generally to latch systems, and more particularly an improved latch system for securing together two portions of an enclosure. Still more particularly, the present invention relates to a latch system for securing together two portions of a kennel for transportation of animals.

2. Background Information

A long-standing practice exists for housing animals in kennels. In particular, portable kennels have been used to transport animals over various distances. For example, portable kennels are used to secure animals for transportation from one location to another on commercial carriers such as airplanes, ships, and buses. Furthermore, these kennels are used to transport animals over shorter distances, such as from a home to a veterinary clinic. These portable kennels may also be used for securing an animal indoors for a short period of time.

Portable kennels generally comprise a housing unit or hull having an opening therein, and a door in the opening to secure an animal in the kennel. In many cases, the kennel housing or hull is in two parts: an upper portion and a lower portion. When the kennel is disassembled, the upper and lower portions may be nested together, thus reducing the amount of space occupied by the kennel for storage purposes. In these types of kennels, a latch or other means must be provided to secure together the upper and lower halves. The latch must be relatively simple to use to facilitate assembly and disassembly of the kennel. Further, the latch should possess sufficient physical strength to hold the two halves of the kennel together and to bear the weight of the animal inside the kennel while the kennel is being transported. The latch should also be capable of being secured against opening to prevent unauthorized disassembly of the kennel.

U.S. Pat. Nos. 5,042,855 and 2,301,078 disclose window latches that employ a rotatable member to engage a cam or lug on another portion of the window assembly to secure together two portions of the window assembly. Neither of these references discloses or suggests provision of a means for locking the latch to prevent unauthorized opening of the latch.

U.S. Pat. No. 2,542,332 discloses a window latch assembly for casement windows that cannot be released by unauthorized persons. However, the latch assembly disclosed is not suitable for securing together two portions of a kennel because it is adapted only to secure a casement window against swinging open.

A need exists, therefore, for a latch having utility in securing together two portions of an enclosure that is capable of being locked to prevent unauthorized opening or disassembly thereof.

SUMMARY OF THE INVENTION

It a general object of the present invention to provide an improved latch system having utility in securing together two portions of a kennel housing.

It is still another object of the present invention to provide an improved latch system that is simple in construction and yet strong enough to bear the weight of a kennel housing including an animal enclosed within the kennel housing.

It is yet another object of the present invention to provide a latch system that may be locked to prevent unauthorized persons from opening or disassembling the kennel housing.

The foregoing and other objects of the present invention are achieved by providing an improved latch for securing together two portions of enclosure in which a rotary latch member is secured for rotation to an upstanding wall of one of the portions of the enclosure. The latch member includes a generally circular disk having an annular wall formed about the periphery thereof, the annular wall having an interruption therein and the latch member being rotatable between locked and unlocked positions. A lug is formed on an upstanding wall of the second portion of the enclosure, wherein upon assembly of the two portions of the enclosure, the lug is received interior of the annular wall through the interruption therein and the latch member is rotated to the locked position to confine the lug within the annular wall. A stop member extends from one of the upstanding walls generally adjacent the periphery of the disk and includes a locking aperture. A locking lug extends generally outward from the annular wall of the latch member and generally tangentially to the periphery of the disk. The locking lug cooperates with the stop member in the locked position to limit rotational movement of the latch member. An aperture is formed in the locking lug to register with the locking aperture in the stop member to permit the latch member to be secured against rotation in the locked position in which the two portions are secured together.

According to one embodiment of the present invention, the latch system includes a detent means coupled between the rotary latch member and the upstanding wall to indicate to a user the condition of the latch. The detent means comprises at least one detent tab extending from the disk interior of the annular wall and a corresponding detent tab formed on the upstanding wall and positioned for engagement with the detent tabs on the disk.

DESCRIPTION OF THE DRAWINGS

The novel features believed characteristic of the invention are set forth in the appended claims. The invention itself, however, as well as a preferred mode of use, and further objects and advantages thereof, will best be understood with reference to the following detailed description of an illustrative embodiment when read in conjunction with the accompanying drawings, wherein:

FIG. 2 is a fragmentary, elevation view of the latch system according to the present invention in a locked position;

FIG. 3 is an enlarged elevation view of a portion of the latch assembly according to the present invention;

FIG. 4 is an enlarged, fragmentary elevation view of a portion of the latch system according to the present invention; and FIG. 5 in an enlarged, fragmentary cross-section view of the latch system according to the present invention.

DESCRIPTION OF THE PREFERRED EMBODIMENT

Figure 1:
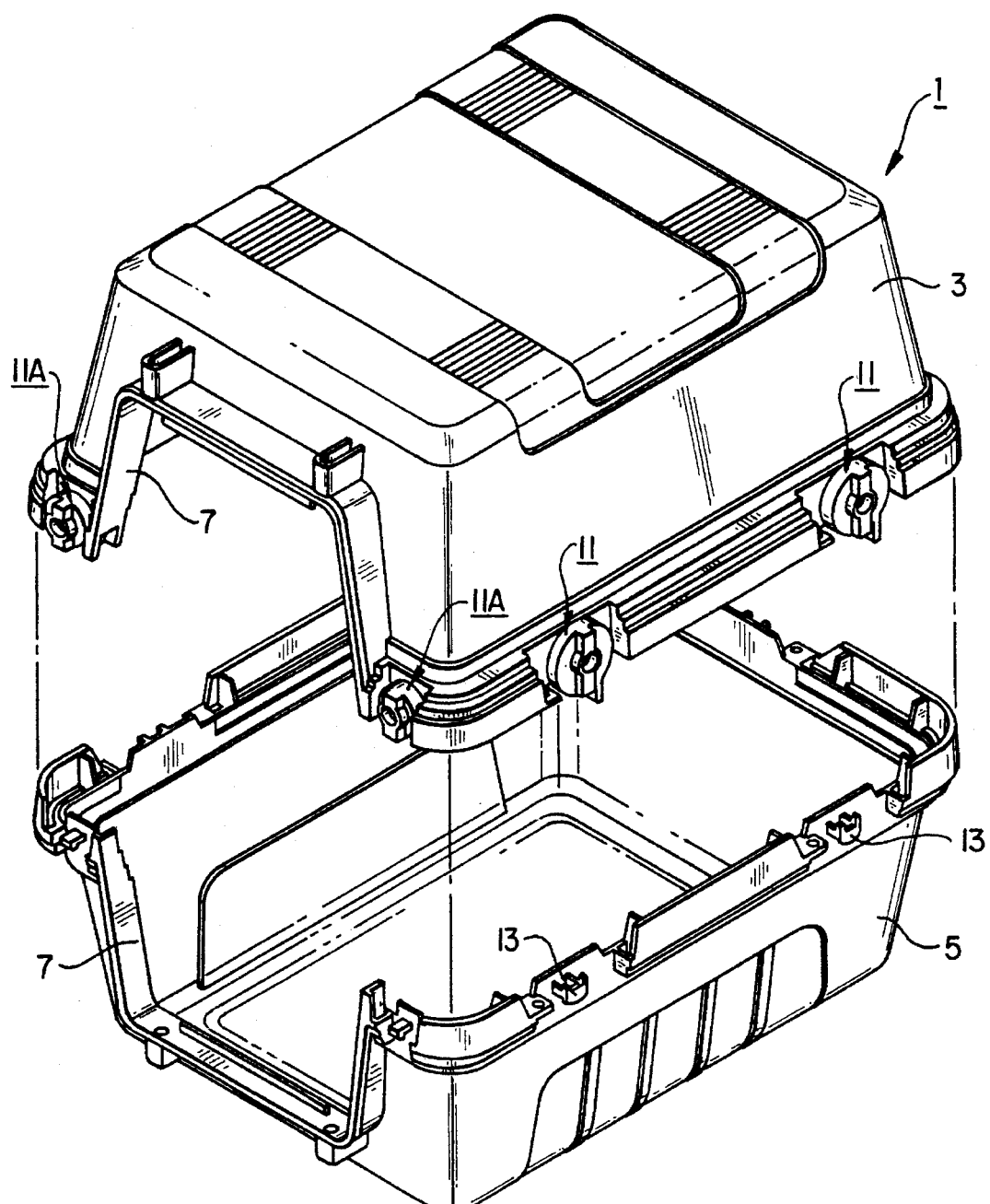
FIG. 1 is an exploded perspective view of a kennel housing utilizing the latch system according to the present invention.

Referring now to the Figures, and in particular to FIG. 1, there is depicted a housing or kennel 1 for the enclosure of an animal. Kennel 1 comprises a first or upper portion 3 and a second or lower portion 5. Each portion 3, 5 includes four upstanding walls, one of which is provided with an opening 7 to permit entry and exit of an animal to and from kennel 1. Prior to assembly of kennel 1, upper portion 3 is detached from lower portion 5 and may inverted and nested in lower portion 5 to reduce the space occupied by kennel 1 during storage or for shipping and inventory purposes. As illustrated in FIG. 1, upon assembly, upper portion 3 is placed atop lower portion 5 and secured thereto by means of a latch assembly 11. As is explained in greater detail with reference to FIG. 5, below, latch assembly 11 cooperates with a lug 13 on an upstanding wall of lower portion 5 to secure the portions together. According to a preferred embodiment, two latch assemblies 11 and mating lugs 13 are provided on each long, upstanding wall of upper and lower portions 3, 5 of kennel 1 and one latch assembly 11 and mating lug 13 is provided on the rear upstanding wall of upper and lower portions 3, 5 of kennel 1. A pair of smaller latches 11A are provided on front of kennel 1 and are structurally and functionally similar to latch assemblies 11, except they lack the locking feature described below.

FIG. 2 depicts a fragmentary elevation view of latch assembly 11 according to the present invention. Latch assembly 11 includes a rotary latch member 15 that is a generally circular disk. Rotary latch member 15 is secured for rotation to an upstanding wall of upper portion 3 of kennel 1 by a screw 17 or other fastening means. Rotary latch member 15 is movable by rotation between locked and unlocked positions (the unlocked position is shown in hidden lines in FIG. 2.)

A locking lug 19 extends from the periphery of latch member 15 and includes a locking aperture 19A. In the locked condition, locking lug 19 abuts a stop member 21 formed on the upstanding wall of lower portion 5 of kennel 1. Stop member 21 further includes an aperture 21A, which registers with locking aperture 19A in locking lug 19 when rotary latch member 15 is in the locked position. A further stop member 23 is provided on the upstanding wall of upper portion 3 of kennel 1, wherein upon assembly of upper and lower portions 3, 5 of kennel 1 stop members 21, 23 abut one another and the apertures therein 21A, 23A are aligned or in registry. With rotary latch member 15 in the locked position, locking lug 19 and stop members 21, 23 abut one another and locking aperture 19A is aligned or in registry with apertures 21A, 23A in stop members 21, 23, and provides a means by which a padlock or similar device secures together latch assembly 11 and portions 3, 5 of kennel 1 to prevent unauthorized disassembly of kennel 1.

FIG. 3 is an elevation view of rotary latch member 15, illustrates the opposite side of latch member 15 from that which is illustrated in FIG. 2. Rotary latch member 15 includes a generally circular disk having an annular wall 27 around the periphery thereof. A pair of opposing shoulders 29 extend from annular wall 27 to define a pair of annular recesses that face toward the interior of rotary latch member 15 defined by annular wall 27. An interruption 31 is provided in annular wall 27 at a location that permits lug 13 on lower portion 5 of kennel 1 to be admitted to the interior of rotary latch member 15 when it is in the unlocked position. At least one detent tab 33 extends perpendicular to the generally circular disk of rotary latch member 15, interior of annular wall 27.

FIG. 4 depicts an elevation view of lug 13 on the upstanding wall of lower portion 5 of kennel 1, viewed from below. As shown, lug 13 includes an external shoulder 13A for engagement with the annular recess defined in annular wall 27 of rotary latch member 15. FIG. 4 also illustrates stop member 21 and aperture 21a therein.

FIG. 5 is a fragmentary, cross-section view of latch assembly 11, illustrating upper and lower portions 3, 5 of kennel 1 secured together with rotary latch member 15 in the locked position, as illustrated in elevation view in FIG. 2. As can be seen, upper portion 3 of kennel is provided with a mounting lug, including an external shoulder 3A, which cooperates with the annular recess defined by annular wall 27 and shoulder 29 on rotary latch member 15 to secure and stabilize rotary latch member relative to upper portion 3 of kennel 1. Engagement between external shoulder 3A of lug and the annular recess in latch member 15 prevents removal of latch member 15 in the locked position, and the lug bears the weight of lower portion 5 of kennel 1, removing virtually all bending load from screw 17. Similarly, in the locked position of rotary latch member 15, external shoulder 13A of locking lug 13 is confined interior of annular wall 27 and in the annular recess defined in annular wall 27 by shoulder 29. Thus, upper and lower portions 3, 5 of kennel 1 are secured together by cooperation between rotary latch member 15 and lug 13. As illustrated in FIG. 2, cooperation between locking lug 19 and stop members 21, 23 on the upstanding walls of upper and lower portions 3, 5 of kennel 1 provides a locking means by which rotary latch member 15 can be secured against rotation from the locked position, thus preventing unauthorized disassembly of kennel 1.

A corresponding detent tab 3B formed on the upstanding wall of upper portion 3 cooperates with detent tabs 33 formed on rotary latch member 15 to provide a user-detectable detent means for indicating to the user the position of rotary latch member 15, and also to temporarily restrain rotary latch member 15 in the open position to facilitate assembly of kennel 1.

With reference now to FIGS. 1–5, the operation of the latch system according the present invention will be described. Prior to assembly of upper and lower portions 3, 5 of kennel 1, rotary latch member 15 is rotated to the open position (shown in hidden lines in FIG. 2), wherein interruption 31 in annular wall 27 is positioned to receive lug 13 on lower portion 5 of kennel. Upper and lower portions 3, 5 of kennel 1 then are aligned and assembled together, wherein lugs 13 on lower portion 5 of kennel 1 are received within the interior of annular walls 25 of rotary latch members 15. Rotary latch members 15 then are rotated to the locked position, in which lugs 13 are confined interior of annular wall 27 of rotary latch member 15, thus securing together upper and lower portions 3, 5 of kennel 1.

In the locked position, locking lug 19 of rotary latch member 15 abuts stop members 21, 23 of upper and lower portion 3, 5 of kennel 1. Apertures 19A, 21A, 23A are aligned or in registry, wherein a padlock or other means may be used to secure rotary member against rotation into the unlocked condition, thus preventing unauthorized opening or disassembly of kennel 1.

The latch system according to the present invention provides a number of advantages. Specifically, the latch system is simple in construction and operation. The latch system according to the present invention also possesses sufficient strength to secure together two portions of an enclosure or kennel and bear the weight of an animal enclosed therein. Further, the latch system according to the present invention may be secured against unauthorized disassembly.

The present invention has been described with reference to preferred embodiments thereof. The invention is thus not limited, but is susceptible to modification and variation without departing from the scope of the invention.

I claim:

1. An improved latch for securing together two portions of an enclosure, said latch comprising:

a rotary latch member secured to a first of said portions of said enclosure, said latch member including a generally circular disk having an annular wall formed about the periphery thereof, said annular wall having an interruption therein and an annular recess formed in said annular wall and facing interiorly of said annular wall, said latch member being rotatable between locked and unlocked positions;

means for rotatably coupling said latch member to a first of said portions, said coupling means including a mounting lug extending from said first portion and having an external shoulder for engagement with said annular recess in said annular wall of said latch member;

a lug formed on a second of said portions of said enclosure;

wherein, upon assembly of said two portions, said lug is received interior of said annular wall through said interruption therein and said latch member is selectively rotated to said locked position to confine said lug within said annular wall, thus securing together said two portions;

a stop member extending from one of said upstanding walls and generally adjacent said periphery of said disk, said stop member including a locking aperture;

a locking lug extending outwardly from said annular wall of said latch member and generally tangentially to said periphery of said disk, said locking lug cooperating with said stop member in said locked position to limit rotational movement of said latch member; and an aperture through said locking lug registering with said locking aperture in said stop member to permit said latch member to be secured against rotation in said locked position in which said two portions are secured together.

2. The improved latch according to claim 1 wherein said enclosure is a kennel for the transportation of animals and said two portions comprise an upper half and a lower half, each of said halves including a flat portion and three upstanding walls, each of said walls being provided with at least one improved latch.

3. The improved latch according to claim 1 further including a detent means coupled between said rotary latch member and said upstanding wall to indicate to a user the condition of said latch.

4. An improved latch for securing together two portions of an enclosure, said latch comprising:

a rotary latch member including a generally circular disk having an annular wall formed about the periphery thereof to define an interior of said latch, said annular wall having an interruption therein, said latch member being rotatable between locked and unlocked positions;

an annular recess formed in said annular wall and facing said interior of said latch member;

means for rotatably coupling said latch member to a first of said portions, said coupling means including a mounting lug extending from said upstanding wall and having an external shoulder for engagement with said annular recess in said annular wall of said latch member;

a lug formed on an upstanding wall of a second of said portions of said enclosure, said lug including an external lug shoulder;

wherein, upon assembly of said two portions, said lug is received in said interior of said latch member through said interruption in said annular wall, and wherein said latch member may be selectively rotated to said locked position to confine said lug within said annular wall with said external lug shoulder in engagement with said annular recess in said annular wall, thus securing together said two portions;

a stop member extending from one of said upstanding walls and generally adjacent said periphery of said disk, said stop member including a locking aperture;

a locking lug extending from said annular wall of said latch member and generally tangentially to said periphery of said disk, said locking lug cooperating with said stop member in said locked position to limit rotational movement of said latch member; and an aperture formed through said locking lug for registry with said locking aperture in said stop member to permit said latch member to be secured against rotation in said locked position in which said two portions are secured together.

5. The improved latch according to claim 4 wherein said coupling means further includes detent means to indicate to a user the position of said latch member.

6. The improved latch according to claim 4 wherein said enclosure is a kennel for the transportation of animals and said two portions comprise an upper half and a lower half, each of said halves including a flat portion and three upstanding walls, each of said upstanding walls being provided with at least one latch.

7. The improved latch according to claim 4 further comprising:

a plurality of detent tabs extending from said disk interior of said annular wall; and a corresponding detent tab formed on said upstanding wall and positioned for engagements with said detent tabs on said disk to provide to a user an indication of the condition of said latch member.

8. An improved kennel for transportation of animals, said kennel comprising:

a first and a second kennel portion, each of said portions including a generally flat portion and three upstanding walls extending from said flat portion;

a rotary latch member including a generally circular disk having an annular wall formed about the periphery thereof to define an interior of said latch, said annular wall having an interruption therein, said latch member being rotatable between locked and unlocked positions;

an annular recess formed in said annular wall and facing said interior of said latch member;

means for rotatably coupling said latch member to at least one upstanding wall of one of said portions of said kennel, said coupling means including a mounting lug extending from said upstanding wall and having an external shoulder for engagement with said annular recess in said annular wall of said latch member;

a plurality of detent tabs extending from said disk and into said interior of said latch member;

a corresponding detent tab formed on said upstanding wall and positioned for engagement with said detent tabs on said disk to provide to a user an indication of the condition of said latch member;

a lug formed on an upstanding wall of the other of said portions of said kennel, said lug including an external lug shoulder;

wherein, upon assembly of said two portions, said lug is received in said interior of said latch member through said interruption in said annular wall, and wherein said latch member may be selectively rotated to said locked position to confine said lug within said annular wall with said external lug shoulder in engagement with said annular recess in said annular wall, thus securing together said two portions;

a stop member extending from one of said upstanding walls and generally adjacent said periphery of said disk, said stop member including a locking aperture;

a locking lug extending from said annular wall of said latch member and generally tangentially to said periphery of said disk, said locking lug cooperating with said stop member in said locked position to limit rotational movement of said latch member; and an aperture formed through said locking lug for registry with said locking aperture in said stop member to permit said latch member to be secured against rotation in said locked position in which said two portions are secured together.

9. An improved kennel for transportation of animals, said kennel comprising:

a first and a second kennel portion, each of said portions including a generally flat portion and three upstanding walls extending from said flat portion;

a rotary latch member including a generally circular disk having an annular wall formed about the periphery thereof to define an interior of said latch, said annular wall having an interruption therein, said latch member being rotatable between locked and unlocked positions;

an annular recess formed in said annular wall and facing said interior of said latch member;

means for rotatably coupling said latch member to at least one upstanding wall of one of said portions of said kennel, said coupling means including a mounting lug extending from said upstanding wall and having an external shoulder for engagement with said annular recess in said annular wall of said latch member;

a lug formed on an upstanding wall of the other of said portions of said kennel, said lug including an external lug shoulder;

wherein, upon assembly of said two portions, said lug is received in said interior of said latch member through said interruption in said annular wall, and wherein said latch member may be selectively rotated to said locked position to confine said lug within said annular wall with said external lug shoulder in engagement with said annular recess in said annular wall, thus securing together said two portions.

10. The improved kennel according to claim 9 wherein said coupling means further includes detent means to indicate to a user the position of said latch member.

11. The improved kennel according to claim 9 further comprising:

a plurality of detent tabs extending from said disk interior of said annular wall; and a corresponding detent tab formed on said upstanding wall and positioned for engagement with said detent tabs on said disk to provide to a user an indication of the condition of said latch member.

12. The improved kennel according to claim 9 further comprising:

a stop member extending from one of said upstanding walls and generally adjacent said periphery of said disk, said stop member including a locking aperture;

a locking lug extending from said annular wall of said latch member and generally tangentially to said periphery of said disk, said locking lug cooperating with said stop member in said locked position to limit rotational movement of said latch member; and an aperture formed through said locking lug for registry with said locking aperture in said stop member to permit said latch member to be secured against rotation in said locked position in which said two portions are secured together.

\* \* \* \* \*